United States Patent
Andreas-Schott et al.

(10) Patent No.: US 8,372,559 B2
(45) Date of Patent: Feb. 12, 2013

(54) LOW COST THERMAL INSULATION FOR A FUEL CELL STACK INTEGRATED END UNIT

(75) Inventors: Benno Andreas-Schott, Bodenheim (DE); Lee C. Whitehead, Middleport, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1149 days.

(21) Appl. No.: 12/254,880

(22) Filed: Oct. 21, 2008

(65) Prior Publication Data

US 2010/0098975 A1  Apr. 22, 2010

(51) Int. Cl.
*H01M 8/04* (2006.01)
(52) U.S. Cl. ........................................ 429/512
(58) Field of Classification Search ........... 429/400–535
See application file for complete search history.

(56) References Cited

U.S. PATENT DOCUMENTS

| | | | |
|---|---|---|---|
| 2003/0152819 A1* | 8/2003 | Hatoh et al. | 429/32 |
| 2003/0203270 A1* | 10/2003 | Rock | 429/37 |
| 2003/0211379 A1* | 11/2003 | Morrow et al. | 429/37 |
| 2005/0084735 A1* | 4/2005 | Breault | 429/38 |
| 2005/0160976 A1* | 7/2005 | Burns | 118/411 |
| 2007/0231651 A1* | 10/2007 | Haufe et al. | 429/32 |

* cited by examiner

*Primary Examiner* — Patrick Ryan
*Assistant Examiner* — Muhammad Siddiquee
(74) *Attorney, Agent, or Firm* — Fraser Clemens Martin & Miller LLC; J. Douglas Miller

(57) ABSTRACT

An end unit for a fuel cell stack is provided. The end unit includes a main body having a cavity and a substantially impermeable barrier disposed thereon to militate against heat transfer within the end unit and minimize a cost of insulating the end unit. A fuel cell system and a method of fabricating the end unit for use in a fuel cell system are also provided.

20 Claims, 3 Drawing Sheets

LOW COST THERMAL INSULATION FOR A FUEL CELL STACK INTEGRATED END UNIT

FIELD OF THE INVENTION

The present disclosure relates to fuel cells and, more particularly, to thin barriers for thermally insulating an integrated end unit of a fuel cell stack.

BACKGROUND OF THE INVENTION

A fuel cell has been proposed as a clean, efficient and environmentally responsible power source for electric vehicles and various other applications. Individual fuel cells can be stacked together in series to form a fuel cell stack. The fuel cell stack is capable of supplying electricity sufficient to power a vehicle. In particular, the fuel cell stack has been identified as a potential alternative for the traditional internal-combustion engine used in modern automobiles.

One type of fuel cell is the polymer electrolyte membrane (PEM) fuel cell. The PEM fuel cell includes three basic components: a pair of electrodes, including a cathode and an anode; and an electrolyte membrane. The electrolyte membrane is sandwiched between the electrodes to form a membrane-electrode-assembly (MEA). The MEA is typically disposed between porous diffusion media, such as carbon fiber paper, which facilitates a delivery of reactants such as hydrogen to the anode and oxygen to the cathode. In the electrochemical reaction of the fuel cell, the hydrogen is catalytically oxidized in the anode to generate free protons and electrons. The protons pass through the electrolyte to the cathode. The electrons from the anode cannot pass through the electrolyte membrane, and are instead directed to the cathode through an electrical load, such as an electric motor. The protons react with the oxygen and the electrons in the cathode to generate water.

The fuel cell stack including a plurality of individual fuel cells may be disposed adjacent an end unit. The end unit may include a plurality of main bodies secured together through the use of any conventional method such as fastening or adhesion. Alternately, the end unit may include a single main body. The main body may house fuel cell subsystems and related devices that aid in the preconditioning and operation of the fuel cell stack. As nonlimiting examples, the fuel cell subsystems and related devices housed within the main body can include end plates, fluid passages, e.g. hydrogen fuel and oxidant (O2/air) passages, coolant pumps, recirculation pumps, drainage valves, fans, compressors, valves, electrical connections, reformers, humidifiers, water vapor transfer units, heat exchangers, and related instrumentation. It should be recognized that additional fuel cell subsystems and related devices used in support of the fuel cell system can also be housed in the main body.

The fuel cell subsystems and related devices housed within the main body may contain a plurality of cavities within the fuel cell subsystems and related devices. The cavities may be a result of manufacturing processes, weight reduction, or a desired arrangement of the fuel cell subsystems and devices. While the cavities greatly decrease the thermal mass of the end unit, the cavities significantly increase an internal surface area of the end unit, promoting excessive heat transfer around and between the fuel cell subsystems and related devices within the end unit. Excessive heat transfer to an operating environment of the end unit may also occur. Excessive heat transfer occurs when an external surface area of the end unit is at a higher temperature than the operating environment. A vehicle compartment is a nonlimiting example of the operating environment. Heat transfer may result in the loss of large amounts of heat energy from the end unit. When the end unit is at a temperature below an optimal starting temperature for a fuel cell stack, heat energy lost to the thermal mass of the end unit may increase the time required for the fuel cell stack to reach a full operating potential.

Insulating the end units of the fuel cell stack is known as a method of reducing energy losses. Insulating wraps have been used to insulate the fuel cell stack end unit. While effective at militating against excessive heat energy loss, the insulating wraps are not without disadvantages.

The insulating wraps added to the end unit of the fuel cell stack increase an overall size of the end unit. The fuel cell stack having a compact size is a desired quality, and in vehicle applications, space is at a premium. A method of insulating the end unit of the fuel cell stack without increasing the overall size of the end unit nay be very desirable to a vehicle manufacturer.

The fuel cell stack may require maintenance with repeated use. For the maintenance to be conducted, the fuel cell stack may need to be disassembled to provide access to the individual fuel cells or the fuel cell subsystems and related devices. Prior to end unit removal, the insulating wraps may need to be removed. The insulating wraps, which may be fragile and prone to excessive wear, may fragment with repeated removal and application. An insulation for the end unit of the fuel cell stack that does not need to be removed provides for faster and less costly repairs of the fuel cell stack.

The insulating wraps added to the end unit of the fuel cell stack do not militate against heat transfer within the end unit. A first portion of the cavities may be located on a first mating surface of the main body. The main body may be disposed against a second mating surface of another one of the main bodies, having a second portion of the cavities. The first portion and the second portion of the cavities may overlap when the main bodies are disposed against each other. An overlap of the cavities allow heat transfer from one of the main bodies to another one of the main bodies. Heat transfer during one of operation, startup, and restart of the fuel cell stack may result in a decrease in the efficiency of the fuel cell stack or an increase in time required for the fuel cell stack to reach the full operating potential. An insulation for the fuel cell stack that militates against heat transfer within the end unit may be desirable to increase the efficiency of the fuel cell stack and to decrease starting time The insulating wraps added to the end unit of the fuel cell stack increase a manufacturing cost of the fuel cell stack and a vehicle into which the fuel cell stack is incorporated. The insulating wraps consume valuable space in vehicle applications. Additionally, a cost of manufacturing and shipping the insulating wraps is high when compared to the benefit the insulating wraps provide. A cost effective insulation may provide a desirable solution to an excessive cost of manufacturing and incorporating the insulating wraps.

There is a continuing need for an insulation for the end unit of the fuel cell stack that is compact and does not need to be removed for fuel cell stack repair. Desirably, insulation for the end unit of the fuel cell stack may also militate against heat transfer within the end unit and reduce the cost of insulating the end unit of the fuel cell stack.

SUMMARY OF THE INVENTION

Presently provided by the invention, an insulation for the end unit of the fuel cell stack that is compact, does not need to be removed for fuel cell stack repair, militates against heat transfer within the end unit, and reduces the cost of insulating the end unit is surprisingly discovered.

In a first embodiment, an end unit for a fuel cell stack, comprises at least one main body disposed adjacent the fuel cell stack, the main body having a mating surface and a cavity formed therein, and a substantially impermeable barrier disposed adjacent the mating surface to cooperate with the cavity to form an insulating enclosure.

In another embodiment, a fuel cell system comprises a fuel cell stack having a plurality of fuel cells, including an end unit for the fuel cell stack having at least one main body disposed adjacent a fuel cell stack, the main body having a mating surface and a cavity formed therein and a substantially impermeable barrier disposed adjacent the mating surface to cooperate with the cavity to form an insulating enclosure.

In a further embodiment, a method for fabricating an end unit for use in a fuel cell system, comprises the steps of providing a main body having a mating surface, the main body having a cavity formed therein, providing a substantially impermeable barrier, disposing the substantially impermeable barrier adjacent the mating surface of the main body, and adhering the substantially impermeable barrier to the mating surface to form an insulating enclosure.

DRAWINGS

The above, as well as other advantages of the present disclosure, will become readily apparent to those skilled in the a from the following detailed description, particularly when considered in the light of the drawings described herein.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the order of the steps presented is exemplary in nature, and thus, is not necessary or critical.

Figure 1:
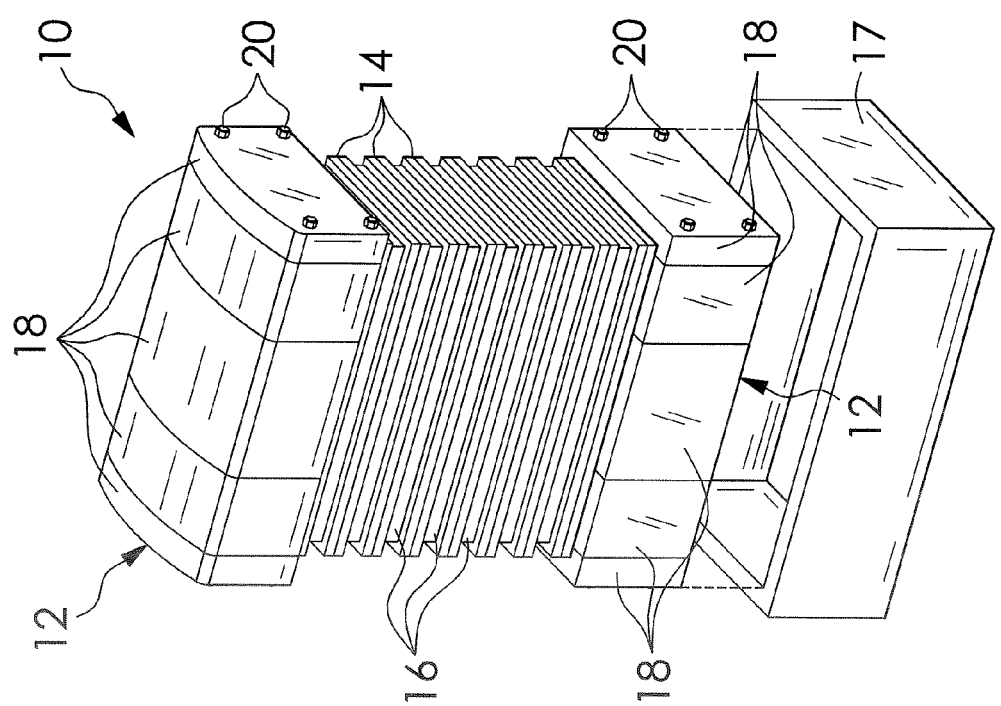
FIG. 1 is a perspective view of an illustrative fuel cell stack known in the art, showing a foam wrap removed from the fuel cell stack.

FIG. 1 depicts a PEM fuel cell stack 10 having a pair of end units 12 separated from each other by a plurality of electrically conductive bipolar plates 14 and membrane electrode assemblies (MEAs) 16. For clarity, a retention system used to hold the fuel cell stack 10 together has been removed. The illustrative fuel cell stack 10 depicted in FIG. 1 has two end units 12, which may be one of an upper and a lower end unit. Additionally, an insulating wrap 17 has been linearly displaced from the fuel cell stack 10 to reveal the lower end unit. A skilled artisan should appreciate that other fuel cell designs and types, such as phosphoric acid fuel cells, solid oxide fuel cells, and alkaline fuel cells, may be employed according to the present disclosure.

The end nits 12 ray include a plurality of main bodies 18. The main bodies 18, represented generically in FIG. 1, may house fuel cell subsystems and related devices that aid in the preconditioning and operation of the fuel cell stack 10. As a nonlimiting example, FIG. 1 illustrates five main bodies 18 secured together by fasteners 20 to form the end units 12. The main bodies 18 may be secured together through the use of any conventional method such as fastening or adhesion. At least one insulating wrap 17 may be disposed around the end units 12. As non-limiting examples, the insulating wrap 17 may be one of a cellulose insulation, a fiberglass insulation, a polystyrene insulation, and a urethane foam insulation. The insulating wrap 17 may be produced from other materials as well. The insulating wrap 17 may be a plurality of insulating pieces or a single piece. The insulating wrap is secured to one of the end units 12 through the use of any conventional method such as fastening, adhesion, or a friction fit.

Figure 2:
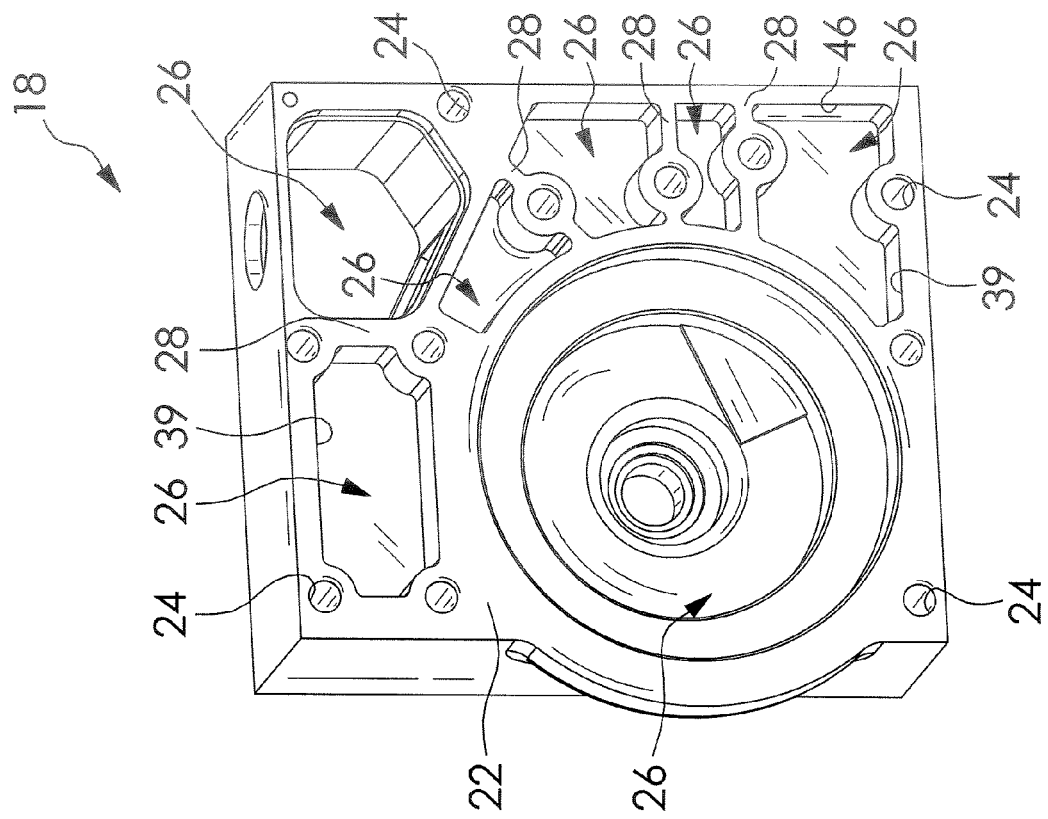
FIG. 2 is a perspective view of a main body according to the present disclosure.

Referring to FIG. 2, a main body 18 according to the present disclosure is shown. The main body 18 may be formed from one of a metal, metal alloy, plastic, and plastic composite. The main body 18 may be produced by one of a machining process and an injection molding process and includes at least one mating surface 22. The mating surface 22 of the main body 18 is adapted to abut a mating surface 22 of an adjacent main body 18. The main bodies 18 disposed adjacent one another may have mating surfaces 22 that substantially correspond to one another. As a nonlimiting example, FIG. 2 illustrates a substantially planar mating surface 22, but other mating surfaces 22 such as a curved surface, a multi-height planar surface, a combination thereof, or a similar variant may be employed. Additionally, the mating surface 22 may include a plurality of fastening apertures 24 in which fasteners 20 are disposed to secure the main body 18 to an adjacent main body 18.

The mating surface 22 includes at least one cavity 26. The cavity 26 may be a result of manufacturing processes, weight reduction, or a desired arrangement of the fuel cell subsystems and devices. The cavity 26 may function as a fluid conduit facilitating the transport of fluids within the fuel cell stack 10. The cavity 26 reduces a surface area of the mating surface 22.

The mating surface 22 may include at least one rib 28, which divides the mating surface 22 into a plurality of cavities 26. In the embodiment shown, the mating surface 22 includes a plurality of ribs 28. The ribs 28 may be a result of manufacturing processes, or a desired arrangement of the fuel cell subsystems and devices. The ribs 28 form a portion of the mating surface 22 and increase the surface area of the mating surface 22.

Figure 3:
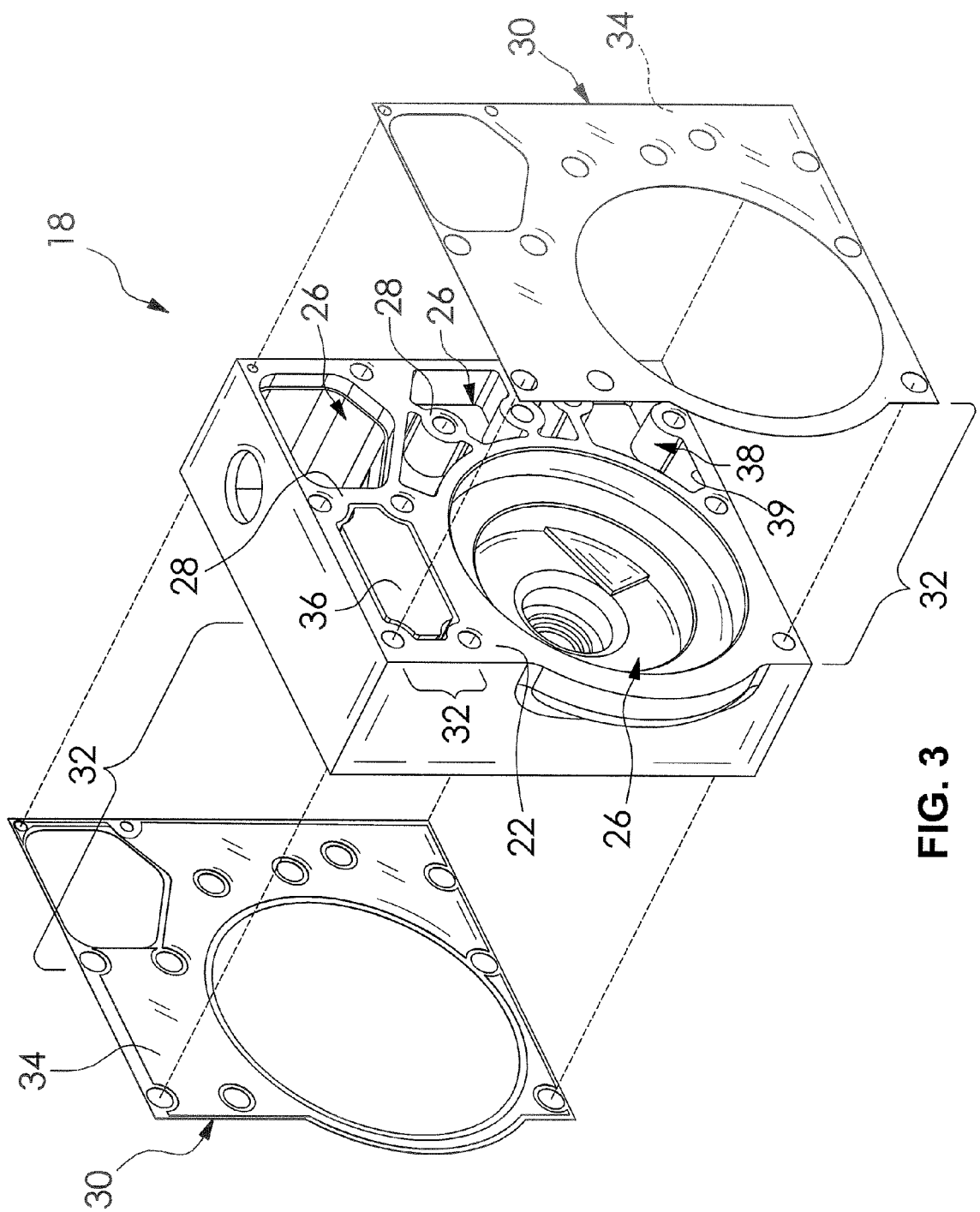
FIG. 3 is an exploded perspective view of the main body illustrated in FIG. 2, including a pair of barriers.

FIG. 3 shows the main body 18 and a pair of barriers 30. The barrier 30 may be a substantially impermeable thin layer and is formed from one of a metal, metal alloy, plastic, and plastic composite. The main body 18 and the barrier 30 may be formed from the same material to increase the recyclability of the main body 18. As illustrated, the barriers 30 cover at least one of the cavities 26. Covering the cavity 26 results in the formation of an insulating enclosure 32. The barriers 30 cooperate with the main body 18 to form a plurality of insulating enclosures 32 within the main body 18. A shape of the barrier 30 may substantially correspond to a shape of the main body 18 upon which it is disposed. It is understood that the barrier 30 may be formed from multiple barriers 30, individually disposed on the mating surface 22 to selectively form the insulating enclosures 32.

An adhesive 34 may be used to secure the barrier 30 to the mating surface 22. The adhesive may be one of a thermoplastic adhesive, a thermoset adhesive, a contact adhesive, a reactant adhesive, and a pressure sensitive adhesive. The adhesive 34 may be disposed on the mating surface 22 prior to disposing the barrier 30 against the mating surface 22, disposed on the barrier 30 prior to disposing the barrier 30 against the mating surface 22, applied separately to the barrier 30 and the mating surface 22, or mixed together and applied to one of the mating surface 22 and the barrier 30 before hardening. As a non-limiting example, an adhesive 34 comprising a plurality of reactants may be used such as an epoxy.

As shown in FIG. 3, a thermal insulating solid 36 or a thermal insulating fluid 38 can be disposed in the insulating enclosure 32. Prior to disposal of the barrier 30 on the mating surface 22, a quantity of the thermal insulating solid 36 is disposed in the cavity 26. The thermal insulating solid 36 may be a solid formed to substantially correspond to the cavity 26 or a loose fill solid that conforms to the cavity 26. As nonlimiting examples, the thermal insulating solid 36 may be one of a cellulose insulation, a fiberglass insulation, a polystyrene insulation, and a urethane foam insulation. Other thermal insulating solids 36 may be used as well.

Alternately, the thermal insulating fluid 38 may be disposed in the cavity 26 prior to placement of both of the barriers 30 against the mating surfaces 22. Adequate containment of the thermal insulating fluid 38, which may be a gas, may pose difficulties to the manufacture of the insulating enclosure 32 because of the ability of the thermal insulating fluid 38 to easily escape the cavity 26 before application of the barrier 30. A specialized assembly chamber may be used to create an environment in which the thermal insulating fluid 38 is ambient to the main body 18, allowing application of the barrier 30 without concern for escape of the thermal insulating fluid 38. After application of the barrier 30, the main body 18 including the insulating enclosure 32 is removed from the specialized assembly chamber. Since the adhesive 34 and the barrier 30 are substantially impermeable, a dispersion of the thermal insulating fluid 38 to another area of the main body 18 or an operating environment is militated against. As non-limiting examples, the thermal insulating fluid 38 may be one of a quantity of air, a quantity of argon gas, a quantity of carbon dioxide gas, and a quantity of krypton gas. Other thermal insulating fluids 38 may be used as well.

The insulating enclosure 32 may include a vacuum. Adequate containment of the vacuum may pose difficulties to the manufacture of the insulating enclosure 32 because of the ability of the vacuum to homogenize with the operating environment before application of the barrier 30. A vacuum assembly chamber may be used to create an environment in which the vacuum is ambient to the main body 18, allowing application of the barrier 30 without concern for homogenization of the vacuum. After application of the barrier 30, the main body 18 including the insulating enclosure 32 is removed from the vacuum assembly chamber. Since the adhesive 34 and the barrier 30 are substantially impermeable, a homogenization of the vacuum to another area of the main body 18 or an operating environment is militated against.

The effects of the insulating enclosure 32 may be maximized through a design of the cavity 26 and a footprint area of the cavity. The footprint area is the area of the mating surface 22 bounded by a cavity peripheral edge 39. It is known that a surface area of an object is directly proportional to the ability of the object to transfer heat to and from the object. Additionally, it is known the heat transfer across a fluid containing gap is inversely proportional to the distance between a pair of surfaces on either side of the fluid containing gap. Accordingly, the volume of the cavity 26 may be increased and the footprint area of the mating surface 22 may be decreased to produce an insulating enclosure 32 that maximizes insulating effects therefrom. As a nonlimiting example, a cavity 26 may be at least 12 millimeters deep to significantly reduce a heat transfer ability of the cavity 26, where the cavity includes one of the thermal insulating solid 36, the thermal insulating fluid 38, and the vacuum.

An end unit 12 for a fuel cell stack 10 according to the present invention may also include the at least one insulating wrap 17 disposed on an outer surface of the end unit 12. The insulating wrap 17 is used to supplement the insulating effects of the barriers 30, militating against a heat transfer from the end unit 12.

Figure 4:
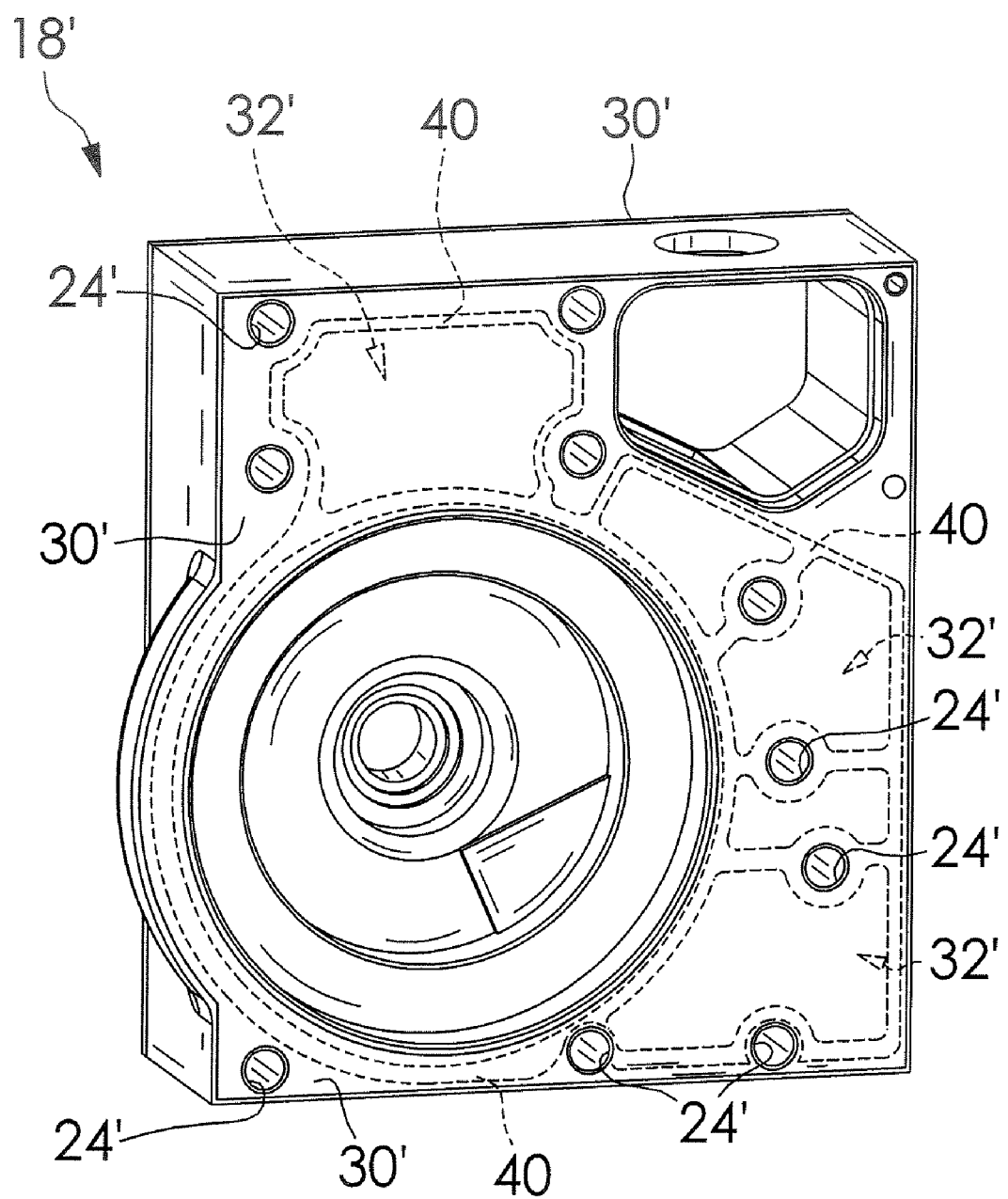
FIG. 4 is a perspective view of the main body illustrated in FIG. 2 including a pair of barriers according to another embodiment of the present disclosure.

FIG. 4 shows another embodiment of the invention similar to that shown in FIG. 3. Reference numerals for similar structure in respect of the description of FIG. 3 are repeated in FIG. 4 with a prime (') symbol.

Mechanical means may also be used to secure the barrier 30' to the mating surface 22', as illustrated in FIG. 4. As a nonlimiting example, hot plate welding may be used. The main body 18' and the barrier 30' formed from one of a plastic and a plastic composite are disposed in a press. A heating platen having a desired weld pattern is inserted between the main body 18' and the barrier 30', making contact with each. The heating platen is activated to cause the main body 18' and the barrier 30' to melt along the weld pattern. After sufficient melting, the heating platen is removed and the main body 18' and the barrier 30' are pressed together and allowed to cool, forming a weld 40. The main body 18' including the barrier 30' is then removed from the press. A plurality of welds 40 formed by hot plate welding may also be used to secure the barrier 30' to the main body 18'. Other methods may be used to secure the barrier 30' to the main body 18', such as heat staking, solvent welding, vibration welding, and contact welding, for example.

In use, an end unit 12 for a fuel cell stack 10 militates against heat transfer within the end unit 12. In sub-freezing temperatures, a portion of the end unit 12 such as a humidifier containing portion may optimally require a desired temperature prior to a remaining portion of the end unit 12 to decrease a startup time of the fuel cell stack 10. The insulating enclosure 32 formed within the main body 18 militates against the remaining portion from becoming a heat sink for the portion requiring a desired temperature by dividing the end unit into a plurality of insulating enclosures 32. Without the use of the insulating enclosures 32, heat transfer through the end unit 12 may become excessive. The excessive heat transfer is a result of a flow of heated fluids through a portion of the end unit (such as a portion containing a coolant pump or a fluid passage) affecting a portion of the end unit that does not contain a flow of heated fluids (such as an air compressor). The excessive heat transfer results in the end unit 12 having a substantially constant temperature during fuel cell stack 10 startup and operation. A plurality of fuel cell subsystems and related devices housed within the end unit 12 such as the fluid passage, the coolant pump, the air compressor, a reformer, and the humidifier may significantly benefit from a presence of the insulating enclosures 32. As a nonlimiting example, the coolant pump may optimally require a lower operating temperature than the reformer, despite a relatively close proximity of the coolant pump and the reformer within the end unit 12.

It should be appreciated that the end unit 12 for a fuel cell stack 10 minimizes the cost of insulating the end unit 12 while providing an end unit 12 that is compact and less costly to repair. It is surprisingly found that the end unit 12 militates against heat transfer within the end unit 12 and to the operating environment. The end unit 12 thereby optimizes one of operation, startup, and restart of the fuel cell stack 10 in sub-freezing temperatures, which results in a maximized efficiency of the fuel cell stack 10 and a minimized time required for the stack 10 to reach a full operating potential.

The present disclosure further includes a method of fabricating the end unit 12 for use in a fuel cell system. The method includes the steps of providing the main body 18 having the mating surface 22, the main body 18 having the cavity 26 formed therein, providing the barrier 30, disposing the barrier 30 adjacent the mating surface 22 of the main body 18, adhering the barrier 30 to the mating surface 22 by one of the adhesive 34 and the weld 40, and forming the insulating enclosure 32 from the cavity 26 and the barrier 30.

Upon providing the main body 18 and the barrier 30, the adhesive 34 may be applied to one of the mating surface 22 and the barrier 30. An application of the adhesive 34 onto the one of the mating surface 22 and the barrier 30 may include at least one of spraying, brushing, roller transfer, and printing the adhesive 34. The adhesive 34 is applied at a thickness sufficient to secure the barrier 30 to the mating surface 22, following a drying of the adhesive 34.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. An end unit for a fuel cell stack, comprising:
   a plurality of main bodies disposed adjacent one another, at least one of the main bodies having a mating surface and a cavity formed therein; and
   a substantially impermeable barrier disposed between adjacent main bodies adjacent the mating surface to cooperate with the cavity to form an insulating enclosure, the substantially impermeable barrier disposed in a plane perpendicular to the fuel cell stack.

2. The end unit for a fuel cell stack of claim 1, wherein an adhesive is disposed between a first side of the substantially impermeable barrier and the mating surface, thereby securing the first side of the substantially impermeable barrier to the mating surface.

3. The end unit for a fuel cell stack of claim 2, wherein the adhesive is disposed on one of the mating surface and the first side of the substantially impermeable barrier prior to the disposing of the first side of the substantially impermeable barrier adjacent the mating surface.

4. The end unit for a fuel cell stack of claim 2, wherein the adhesive is one of a thermoplastic adhesive, a thermoset adhesive, a contact adhesive, a reactant adhesive, and a pressure sensitive adhesive.

5. The end unit for a fuel cell stack of claim 2, wherein the adhesive includes a plurality of reactants, the reactants applied separately to the first side of the substantially impermeable barrier and the mating surface.

6. The end unit for a fuel cell stack of claim 1, wherein the substantially impermeable barrier is secured to the mating surface by at least one weld.

7. The end unit for a fuel cell stack of claim 1, wherein the at least one of the main bodies and the substantially impermeable barrier are formed from a same material.

8. The end unit for a fuel cell stack of claim 1, wherein one of a metal, a metal alloy, a plastic, and a plastic composite is used to form one of the at least one of the main bodies and the substantially impermeable barrier.

9. The end unit for a fuel cell stack of claim 1, wherein the mating surface includes a rib, dividing the mating surface into a plurality of cavities.

10. The end unit for a fuel cell stack of claim 1, wherein the cavity of at least one of the main bodies includes one of a thermal insulating solid and a thermal insulating fluid disposed therein.

11. The end unit for a fuel cell stack of claim 1, wherein the insulating enclosure is placed under a vacuum.

12. The end unit for a fuel cell stack of claim 1, wherein the end unit includes at least one insulating wrap disposed on an outer surface of one of the end unit for a fuel cell and the at least one of the main bodies.

13. The end unit for a fuel cell stack of claim 1, wherein the end unit for a fuel cell stack is one of a lower end unit and an upper end unit.

14. The end unit for a fuel cell stack of claim 1, wherein a shape of the substantially impermeable barrier substantially corresponds to the mating surface of the at least one of the main bodies.

15. The end unit for a fuel cell stack of claim 1, wherein the main bodies are formed by injection molding.

16. A fuel cell system comprising:
   a fuel cell stack having a plurality of fuel cells, including an end unit for the fuel cell stack having a plurality of main bodies disposed adjacent one another, at least one of the main bodies having a mating surface and a cavity formed therein and a substantially impermeable barrier disposed between adjacent main bodies adjacent the mating surface to cooperate with the cavity to form an insulating enclosure, the substantially impermeable barrier disposed in a plane perpendicular to the fuel cell stack.

17. The fuel cell system of claim 16, wherein an adhesive is disposed between a first side of the substantially impermeable barrier and the muting surface, thereby securing the first side of the substantially impermeable barrier to the mating surface.

18. The fuel cell system of claim 16, wherein the main body and the substantially impermeable barrier are formed from a same material.

19. The fuel cell system of claim 17, wherein the adhesive is one of a thermoplastic adhesive, a thermoset adhesive, a contact adhesive, a reactant adhesive, and a pressure sensitive adhesive.

20. A method for fabricating an end unit for use in a fuel cell system, comprising the steps of:
   providing a main body having a mating surface, the main body having a cavity formed therein;
   providing a substantially impermeable barrier;
   disposing the substantially impermeable barrier adjacent the mating surface of the main body; and
   adhering the substantially impermeable barrier to the mating surface to form an insulating enclosure, the substantially impermeable barrier disposed in a plane perpendicular to the fuel cell stack.

* * * * *